(12) United States Patent
Laaksonen et al.

(10) Patent No.: US 9,096,382 B2
(45) Date of Patent: Aug. 4, 2015

(54) PROTECTIVE COVER FOR THE DISCHARGE END OF A CONVEYOR

(75) Inventors: Iiro Laaksonen, Tampere (FI); Jaakko Pitkakangas, Hollola (FI); Ari Hannimaki, Hollola (FI); Jari Sorvisto, Hollola (FI)

(73) Assignee: Andritz OY, Helsinki (FI)

( * ) Notice: Subject to any disclaimer, the term of this patent is extended or adjusted under 35 U.S.C. 154(b) by 68 days.

(21) Appl. No.: 13/882,156

(22) PCT Filed: Oct. 25, 2011

(86) PCT No.: PCT/FI2011/050931
§ 371 (c)(1),
(2), (4) Date: Aug. 13, 2013

(87) PCT Pub. No.: WO2012/056104
PCT Pub. Date: May 3, 2012

(65) Prior Publication Data
US 2013/0313083 A1    Nov. 28, 2013

(30) Foreign Application Priority Data
Oct. 27, 2010  (FI) .................................... 20106117

(51) Int. Cl.
*B65G 21/00* (2006.01)
*B65G 21/10* (2006.01)
*B65G 21/08* (2006.01)

(52) U.S. Cl.
CPC ............... *B65G 21/10* (2013.01); *B65G 21/08* (2013.01)

(58) Field of Classification Search
CPC ................................. B65G 21/08; B65G 21/10

USPC .................................. 198/860.1, 860.3, 860.5
See application file for complete search history.

(56) References Cited

U.S. PATENT DOCUMENTS

| | | | | |
|---|---|---|---|---|
| 1,108,386 A * | 8/1914 | Norton | ........................ | 198/860.1 |
| 1,366,103 A * | 1/1921 | Sturtevant | ...................... | 198/701 |
| 2,644,574 A * | 7/1953 | Mercier | ...................... | 198/860.5 |
| 2,760,622 A * | 8/1956 | Magee | ........................ | 198/735.5 |
| 2,890,803 A * | 6/1959 | Vanier et al. | ................... | 414/292 |
| 4,170,293 A | 10/1979 | Campbell | | |
| 5,400,897 A * | 3/1995 | Doyle | ............................ | 198/496 |
| 7,789,217 B2 * | 9/2010 | Fischer et al. | ................. | 198/525 |

FOREIGN PATENT DOCUMENTS

| | | |
|---|---|---|
| FR | 2 454 986 | 11/1980 |
| GB | 1 518 053 | 7/1978 |

* cited by examiner

Primary Examiner — William R Harp
(74) *Attorney, Agent, or Firm* — Nixon & Vanderhye P.C.

(57) ABSTRACT

A cover and frame assembly for a discharge end of a belt conveyor, the assembly including: a stationary frame supporting the discharge end and including sides extending beyond the discharge end; a cover having a top, opposite side walls extending down from the top and an end face extending between the side walls and down from the top; a rim along each of the side walls, wherein each the rim seats on an upper edge of one of the sides of the stationary frame, while the cover is closed over the discharge end, and a roller on each upper edge of the sides of the stationary frame, wherein each roller extends above the upper edge and seats in a hole or pit in the rim seated on the upper edge while the cover is closed, wherein the rim of each side wall slides over the corresponding roller as the cover is opened.

14 Claims, 3 Drawing Sheets

PROTECTIVE COVER FOR THE DISCHARGE END OF A CONVEYOR

RELATED APPLICATIONS

This application is the U.S. national phase of International Application No. PCT/FI2011/050931 filed Oct. 25, 2011 which designated the U.S. and claims priority to FI 20106117 filed Oct. 27, 2010, the entire contents of each of which are hereby incorporated by reference.

FIELD OF THE INVENTION

The present invention relates to an apparatus for transferring loose material, especially to a belt conveyor for transferring wood chips. Large belt conveyors are most commonly used in chip transfer e.g. at a wood processing yard when storing chips in an open storage in form of a pile and when reclaiming chips from the pile. The invention relates most preferably to belt conveyors, but it can offer corresponding advantages also in connection with other large-sized conveyor solutions. The invention is exquisitely applicable for transporting or transferring wood chips, but it is also applicable for use in connection with other loose materials, such as wood bark, coal, corn or other granular material.

BACKGROUND OF INVENTION

In a belt conveyor the belt rotates between two end rollers, at least one of which is a drive roller. A drive motor can be arranged inside the drive roller. The conveyor transfer loose material from the feed end to the discharge end. The discharge ends of large belt conveyors having a belt width of over 650 mm are commonly protected with protective covers, since the material being transported does not emit dust on the belt, but when it leaves the belt, dust is released. The protective cover also protects the components of the discharge end against the impacts of weather and muffles noise. The discharge end can be provided with channels that suck dust.

In the presently used technique, the protective covers of large conveyors are made of steel and are fixed with bolts to the frame of the discharge end or the frame of the conveyor and they usually have inspection lids for monitoring the condition of the drive roller of the conveyor, the motor of the drive roller and other components of the discharge end of the conveyor. The inspection lids have been used for allowing the handling of the lids by one service-man and for eliminating the need to remove a large and heavy protective cover.

Usually the inspection lids are located on the protective cover and/or at the sides thereof and they can be opened or transparent. The lids are fairly small and they only allow viewing the equipment and thus checking and discovering the condition. The lids have not allowed any maintenance actions. In view of the regulation of the material guide plate of a belt conveyor, maintenance of the drive drum, condition monitoring of the cleaners and clearing of hopper clogging, the present protective cover constructions that are fixed with bolts and provided with only fairly small inspection lids are highly unpractical and expensive solutions.

In the prior art solutions the inspection lid in the protective cover only allows checking the discharge end. Further, the lids provide poor visibility so that it is impossible to see properly through them, and thus it impossible even to reliably check the situation. Also, maintenance is troublesome in the prior art solutions due to poor accessibility of the discharge end of the conveyor. In the prior art solutions the protective cover of the discharge end of the conveyor has to be removed totally for maintenance purposes. The protective cover is, however, of fairly big size and heavy and the opening requires a number of workers and, for assistance, lifting tackles and at least one crane. Only to open the protective cover takes from half an hour even up to half of a day.

In the prior art solutions, maintenance is often neglected due to its difficulty. When maintenance is neglected, material to be transferred is allowed to accumulate under the return belt, which causes clogging. Clogging generates disturbances in the process, which may result in production breaks. Further, when material streams change, the guide plate should be adjusted for ensuring optimal performance, but the adjustment is troublesome and therefore it may often be neglected.

At the worst case, using prior art technology, the maintenance operations for a discharge end of a belt conveyor can be neglected due to the difficulty and time-consuming character, which may even result in break down of the equipment. This, in turn, causes repair costs or even replacement of the discharge end of the conveyor as a whole, which is expensive already due to equipment costs and additionally causes an even longer break in production.

SUMMARY OF INVENTION

The present invention provides a solution for the above problems. A protective cover construction for the discharge end of a conveyor has been developed, which allows efficient and safe working in all cases due to its size and mobility. In the novel solution according to the invention the discharge end is provided with a frame, whereto one integral, opening protective cover is fixed. It protects the constructions and components of the discharge end at the sides, from the top and at the end face.

This protective cover according to the invention can be completely moved out of the way of the discharge end of a conveyor most preferably by means of rollers, hinge arms and relieving springs fixed to the frame. If it is moved partly upon the bottom frame, it does not require lot of space around it, which is a considerable advantage inside confined conveyor bridges and processes. In addition, there is no actual need to move the center of gravity of the cover higher, since the end face of the cover is moved downwards as the back edge rises. This decreases the force required for moving.

The hinging of the construction can also be accomplished differently. It can e.g. simply be hinged at its end face to the frame and lifted by means of relieving springs upwards at only its conveyor-side end. Then the center of gravity, however, rises even considerably and a lot more space is required, especially in the vertical direction. It is essential, that the protective cover when being moved aside provides adequate space for inspection and maintenance actions and that it can be moved by one person.

In the solution according to the invention the integral cover has a construction that can be opened. The protective cover is easy to open by opening one latch or other fixing member and moving the protective cover aside. This takes, at the best, less than one minute and usually it takes less time than unscrewing of the screws of an individual inspection lid. It would also be possible to hinge the protective cover to open aside of the discharge end, if there are no service objects at that side.

The construction according to the invention is simple and rigid and provides good access to maintenance objects via a large opening. Maintenance work is easy due to adequate visibility. Also the replacement of parts is easy due to good access to the serviced object. If needed, the protective cover can also be completely removed.

Additional advantages of the invention include e.g. the following:
- decreased space requirement when the protective cover is open, whereby walking around on the working platform surrounding the discharge end is possible, even when the protective cover is open,
- the protective cover is so light to handle that it can be opened by one person, which considerably quickens inspection and maintenance,
- no need for crane and lifting tackles for opening the protective cover, but it is possible to use them when replacing components of the discharge end without detaching the protective cover,
- used light materials are also weather resistant
- economical savings, since maintenance becomes easier, quicker and will be carried out,
- less connection surfaces, since no separate inspection lids are needed and
- the end drum of a belt conveyor is easily replaced, since there is no need to detach the protective cover.

SUMMARY OF DRAWINGS

In the following, the invention is disclosed in more detail with reference to the appended drawings, of which

DETAILED DESCRIPTION OF THE INVENTION

Figure 1:
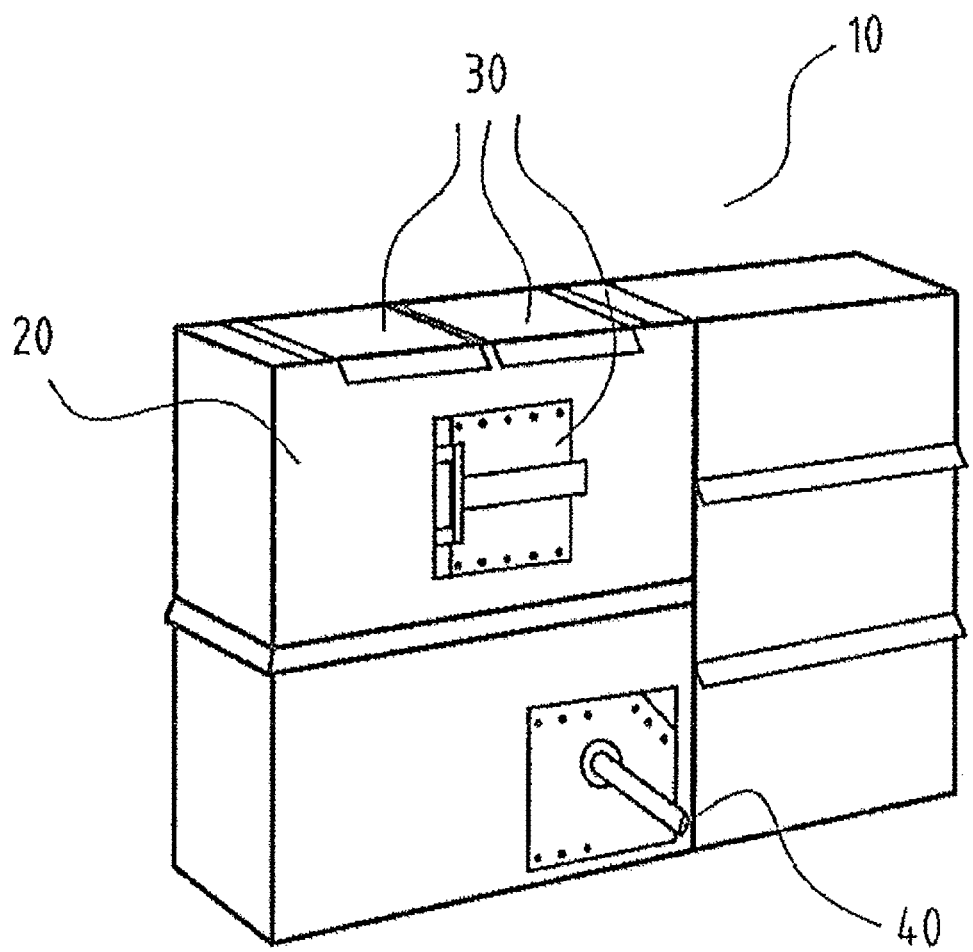
FIG. 1 illustrates a protective cover for the discharge end of a belt conveyor according to prior art.

FIG. 1 illustrates a prior art discharge end construction 20 for the discharge end 10 of a belt conveyor. The protective cover is provided with inspection lids 30. The inspection lids 30 are usually located on and/or at the sides of the protective cover. Visibility through the inspection lids 30 to the interior of the discharge end 10 is limited. FIG. 1 illustrates also the head of the drive shaft 40 of the end drum of a belt conveyor.

Figure 2:
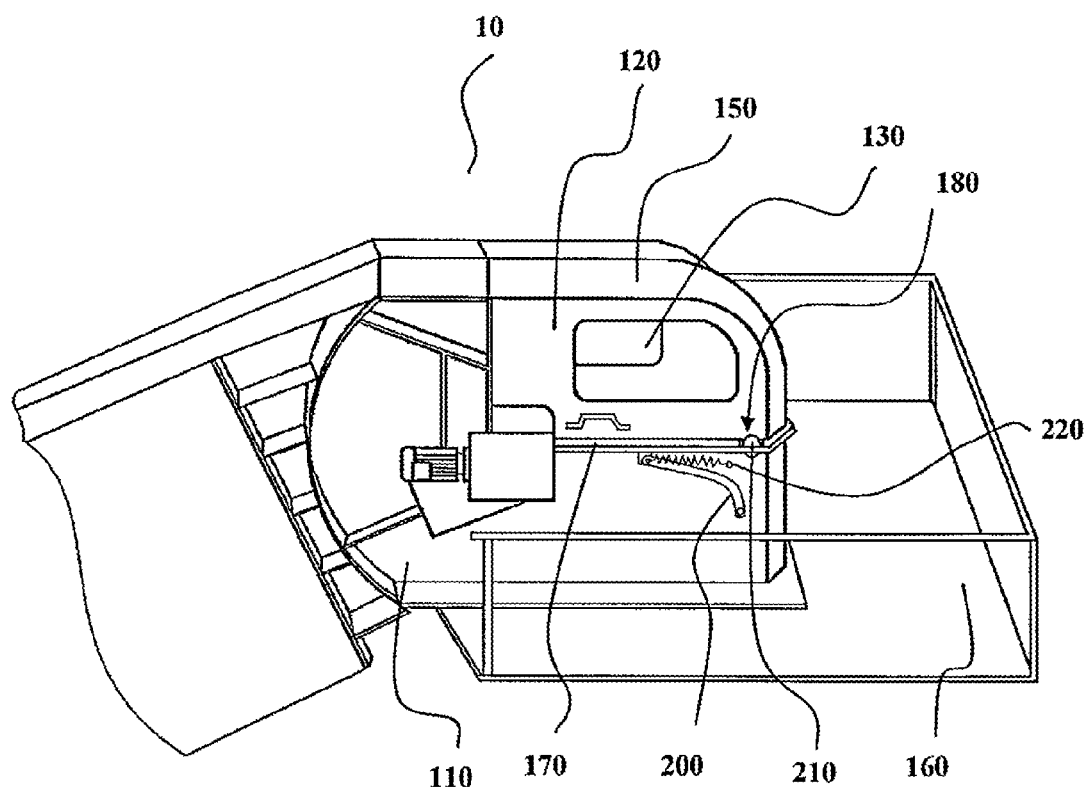
FIG. 2 illustrates a protective cover construction for the discharge end of a belt conveyor according to the present invention, the dust cover being closed.
Figure 3:
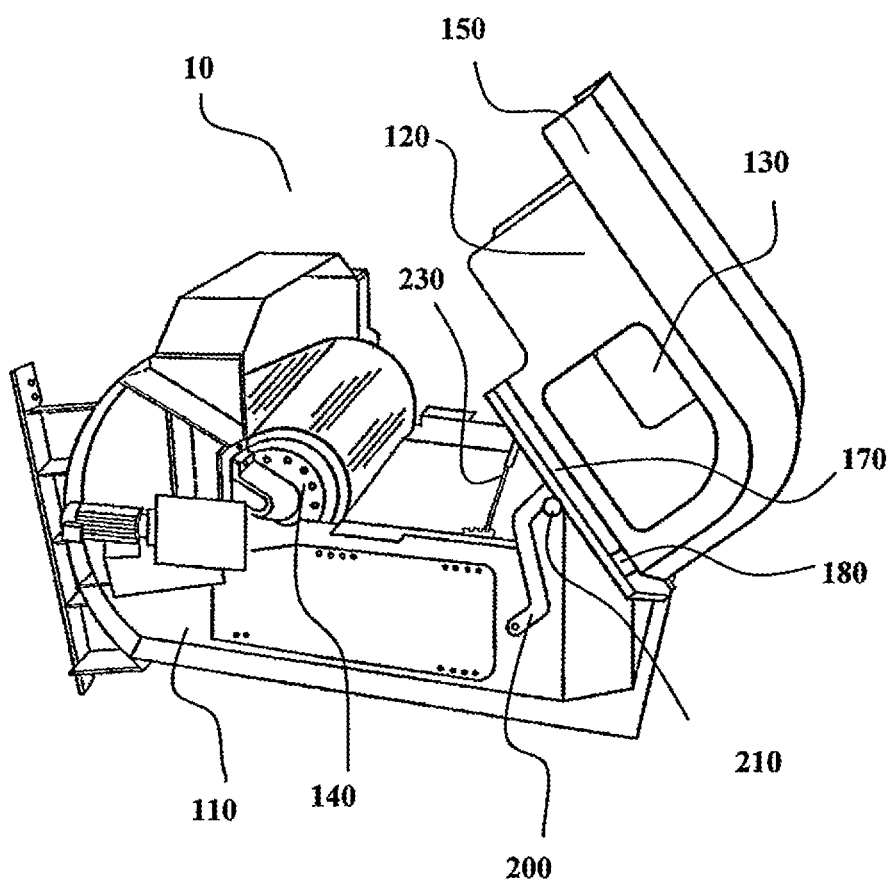
FIG. 3 illustrates a protective cover construction for the discharge end of a belt conveyor according to the present invention, the protective cover being open.

FIGS. 2 and 3 illustrate a solution according to a highly preferable embodiment of the invention. The figures show the discharge end 10 of a belt conveyor. The discharge end 10 has a frame 110 and according to the invention an integral protective cover 120 that opens to the face end of the discharge end. The integral protective cover 120 covers the constructions and components of the discharge end 10 at four sides: from the top, at both sides and at the face end. The integral protective cover 120 is at its sides preferably provided with transparent inspection windows 130, through which the condition of the discharge end is easy to check. In addition, FIG. 3 illustrates a drive end drum 140 of a belt conveyor.

For opening the protective cover 120, a screw, a latch or other fixing member is opened and the protective cover is drawn towards the end face thereof simultaneously lifting it at its rear edge, whereby the whole protective cover 120 slides partly upon the frame 110 of the discharge end 10. Thus the protective cover does not require a lot of space around it even when opened, which is a considerable advantage within confined spaces.

Other Preferred Embodiments of the Invention

Further, for saving space, weight and material, as well as for increasing rigidity, the protective cover 120 and the frame 110 can be formed beveled, as shown in FIGS. 2 and 3 with reference numeral 150, whereby the protective cover when open takes less space from the working platform 160. This makes maintenance easier.

The protective 120 cover is advantageously hinged for controlled moving aside. Preferably it is hinged to open to the direction of the end face side. In FIGS. 2 and 3 the front edge of the frame 110 is at both its sides provided with a pivoted roller 210, on which the protective cover 120 is supported when it is being opened and is rolling forward along a flanged rim 170 surrounding the bottom edge of the cover. A hinge arm 200 controls the moving of the protective cover 120 and limits the extent of its opening.

Preferably the flanged rim 170 of the protective cover 120 is provided with a hole or a pit 180, in which the roller 210 sits and keeps the protective cover 120 in place when it is closed. When starting the opening, the face of the protective cover 120 is to be lifted and drawn forward for moving the holes 170 or pits 180 of the flanged rim of the protective cover aside from the rollers 210. One or more latches, screws or other locking members may also be used to keep the protective cover 120 closed.

If desired, the opening of the protective cover 120 can be lightened by using a spring 220, e.g. in connection with the hinge arm 200. Also, a gas spring 230 may be used for this purpose, which gas spring can also act instead of the hinge arm 200, between the protective cover 120 and the frame 110 of the discharge end. If needed, the protective cover 120 can be completely removed by detaching the hinges 200.

The protective cover 120 can be opened such that a large opening is formed in the discharge end 10. The large opening provides in the vertical direction free access for maintenance operations. Thus, components of the discharge end, such as the pull drum 140 can be lifted and replaced with a crane. The opening angle of the protective cover can be variable and fixable e.g. by means of a gas spring 230 or a strut rod in one or several different positions. In the solution illustrated in FIG. 2, the front edge of the protective cover 120 is in the horizontal direction lower than the shaft 40 of the drive drum 140, but it can also extend lower or higher.

The protective cover according to the invention can be made of reinforced plastic, made by rotational casting, vacuum molding with metal reinforcement or alternatively more conventionally e.g. as an aluminum thin plate construction. The choice of material allows producing an adequately light-weighted and durable protective cover.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. An apparatus configured to cover a discharge end of a belt conveyor transporting loose material, the apparatus comprising:
   a protective cover including a top, opposite sides extending down from the top and an end face extending between the sides and down from the top, wherein when the cover is in a first position the top is above the discharge end, the opposite sides are adjacent sides of the discharge end and the end face is adjacent an end of the discharge end, the sides seat on a frame for the discharge end while the cover is closed on the discharge end and the sides unseat from the frame while the cover is opened, wherein the sides slide on the frame as the cover moves between being closed and being opened.

2. The apparatus according to claim 1 wherein the protective cover is hinged to the frame.

3. The apparatus according to claim 1 wherein at least one of the protective cover and the frame is beveled.

4. An apparatus configured to cover a discharge end of a belt conveyor transporting loose material, the apparatus comprising:
   a protective cover including a top, opposite sides extending down from the top and an end face extending between the sides and down from the top, wherein when the cover is in a first position the top is above the discharge end, the opposite sides are adjacent sides of the discharge end and the end face is adjacent an end of the discharge end, the sides seat on a frame for the discharge end while the cover is closed on the discharge end and the sides unseat from the frame while the cover is opened, wherein the sides slide on the frame as the cover moves between being closed and being opened, and wherein the frame includes pivoted rollers, and the protective cover is supported by the rollers when turned open and the sides of the cover slide over the rollers.

5. The apparatus according to claim 4 further comprising a flanged rim on each side of the protective cover, wherein the flanged rims each include a hole or pit, wherein the pivoted rollers seat in the hole or pit when the protective cover is closed.

6. The apparatus according to claim 4 wherein the protective cover further includes a spring extending between frame and at least one of the sides of the protective cover.

7. The apparatus according to claim 6 wherein the spring includes a gas spring.

8. The apparatus according to claim 4 wherein the protective cover is formed of at least one of a reinforced plastic, or from aluminum.

9. A cover and frame assembly for a discharge end of a belt conveyor, the assembly comprising:
   a stationary frame supporting the discharge end and including sides extending beyond the discharge end;
   a cover having a top, opposite side walls extending down from the top and an end face extending between the side walls and down from the top;
   a rim along each of the side walls, wherein each the rim seats on an upper edge of one of the sides of the stationary frame, while the cover is closed over the discharge end, and
   a roller on each upper edge of the sides of the stationary frame, wherein each roller extends above the upper edge and seats in a hole or pit in the rim seated on the upper edge while the cover is closed,
   wherein the rim of each side wall slides over the corresponding roller as the cover is opened.

10. The cover and frame assembly as in claim 9 further comprising a hinge arm pivotably mounted to each side of the frame and to the side wall of the cover seated on the upper edge of the side when the cover is closed, wherein as the cover is opened each roller unseats from the hole or pit and the cover pivots with the arm to expose the discharge end.

11. The cover and frame assembly as in claim 9 wherein the rim on each side wall is at a bottom edge of the side wall.

12. The cover and frame assembly as in claim 9 wherein the rollers pivot as the cover is opened.

13. The cover and frame assembly as in claim 9 wherein the cover is hinged to the frame.

14. The cover and frame assembly as in claim 9 wherein the rim on each of the sidewalls of the cover are flanged rims extending horizontally while the cover is closed.

\* \* \* \* \*